United States Patent
Adams et al.

(10) Patent No.: US 6,369,711 B1
(45) Date of Patent: Apr. 9, 2002

(54) PROFILE CORRECTED LABEL WITH RFID TRANSPONDER AND METHOD FOR MAKING SAME

(75) Inventors: Matthew T. Adams, Cincinnati; Kevin Girard Conwell, Fairfield, both of OH (US)

(73) Assignee: Intermec IP Corp, Woodland Hills, CA (US)

( * ) Notice: Subject to any disclaimer, the term of this patent is extended or adjusted under 35 U.S.C. 154(b) by 0 days.

(21) Appl. No.: 09/591,294

(22) Filed: Jun. 9, 2000

(51) Int. Cl.[7] .............................................. G08B 13/14
(52) U.S. Cl. ................ 340/572.1; 340/571; 340/572.4; 340/572.8
(58) Field of Search ........................... 340/572.1, 572.6, 340/572.4, 571, 572.8; 156/290

(56) References Cited

U.S. PATENT DOCUMENTS

| | | | | |
|---|---|---|---|---|
| 5,427,099 A | * | 6/1995 | Adams | 128/653.1 |
| 5,560,970 A | * | 10/1996 | Ludebuhl | 428/41.9 |
| 5,566,441 A | * | 10/1996 | Marsh et al. | 29/600 |
| 5,654,693 A | * | 8/1997 | Cocita | 340/572 |
| 5,786,626 A | * | 7/1998 | Brady et al. | 257/673 |
| 5,982,284 A | * | 11/1999 | Baldwin et al. | 340/572.8 |
| 6,100,804 A | * | 8/2000 | Brady et al. | 340/572.7 |
| 6,147,604 A | * | 11/2000 | Wiklof et al. | 340/572.1 |

* cited by examiner

*Primary Examiner*—Jeffery Hofsass
*Assistant Examiner*—Son Tang
(74) *Attorney, Agent, or Firm*—Orum & Roth

(57) ABSTRACT

The present invention sets out a label containing an RFID transponder having a uniform printable surface. The present invention presents a face sheet having an increased rigidity and/or thickness which does not readily conform to the profile of an RFID transponder contained beneath the face sheet. This results in a label having a more readily printable surface, and also presents a label having higher security as a result of the masking of the profile of the contained RFID responder.

8 Claims, 2 Drawing Sheets

PROFILE CORRECTED LABEL WITH RFID TRANSPONDER AND METHOD FOR MAKING SAME

BACKGROUND OF THE INVENTION

1. Field of the Invention

The present invention pertains to labels, such as pressure sensitive labels, which contain an RFID transponder as part of the label. In particular, the invention pertains to printable labels which may be attached to an item using pressure sensitive adhesives. Images may be printed on the labels using thermal printers which rely on heat and/or pressure to create the image, such as direct thermal or thermal transfer printers. The label containing an RFID transponder may be known as a smart label.

2. Description of the Related Art

In the past, smart labels containing an RFID transponder presented many problems relating to printing on the label. The generally uneven profile of an RFID transponder, when inserted into a label by positioning the RFID within layers of the label, results in physically supported areas and unsupported areas of the face sheet of the label. The face sheet is, as a result, uneven in its profile. Previously, the use of standard paper and film materials in the construction of a smart label resulted in a non-uniform surface profile for printing. Because of this uneven profile, when attempting to print on the label utilizing a direct thermal process or a thermal transfer process, uneven images are created on the printable surface. The profile presented by the RFID chip embedded in the smart label created print voids or uneven image density because of pressure gradients as the transponder section of the label passes under the thermal print head. This circumstance can create critical problems on printed labels, in particular on bar code labels where the bar code image must be uniform enough to be scanned by an optical scanner. If the face sheet was impossible to print on because of the uneven profile, it would be necessary in the past to attempt to print around the RFID transponder contained in the label. This creates problems in printing, because in order to avoid the RFID transponder, the printer would have to avoid the transponder during the printing process, which involves identifying the exact location of the transponder prior to printing, and then controlling the printer to print around the transponder.

Another problem in prior labels is that in some applications, such as when security is a concern, it is necessary to mask the presence of an RFID transponder in a label. Prior art materials used in the construction of smart labels did not effectively mask the existence of an RFID transponder in the label. This defeats the goal of maintaining the security or the anti-counterfeiting capacity of the label.

The uneven profile printability and security problems are overcome by the present invention.

SUMMARY OF THE INVENTION

The present invention presents a label containing an RFID transponder having a more uniform profile for printing, and also for concealment of the presence of an RFID transponder within the label. The invention teaches a new structure and method for reducing the uneven profile of a label containing an RFID transponder by utilizing a unique face sheet or face sheets which minimize the difference between unsupported and supported areas along the printable surface of the label.

It is an object of the invention to present a label containing an RFID transponder having a uniform surface profile for printing.

It is a further object of the invention to present a label having a uniform profile for concealment of the presence of an RFID transponder in a label.

It is a further object of the invention to present a label having a face sheet with a relatively high density and stiffness to reduce deformation and bending in the face sheet so as to not conform unevenly to the shape of the RFID transponder.

These and other objects of the invention will be realized by the structure and method set out below.

DETAILED DESCRIPTION OF INVENTION

Figure 1:
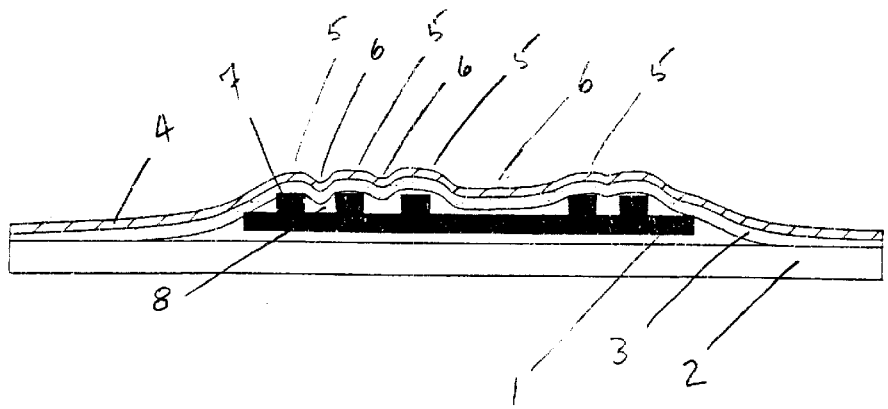
FIG. 1 is a sectioned side view of a prior art label containing an RFID transponder.

As shown on a prior art FIG. 1, past smart labels containing RFID transponders presented an uneven profile for printing on a face sheet. As seen, the presence of the RFID transponder creates distinct supported and unsupported areas of the face sheet, which in turn results in a surface poorly suited for receiving a uniform image created by a thermal printer.

Figure 2:
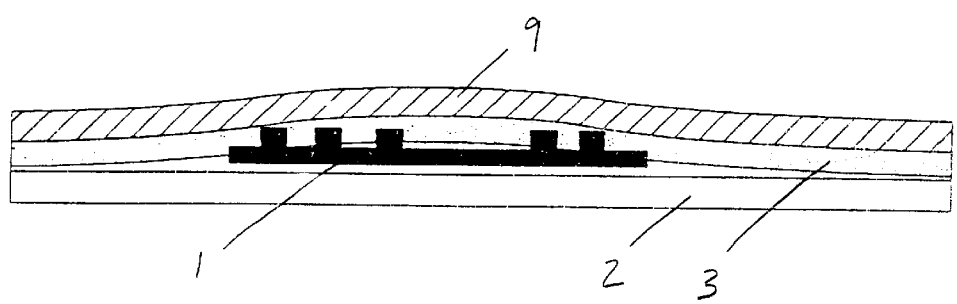
FIG. 2 is a sectioned side view of one embodiment of the present invention utilizing a liner.

FIG. 2 illustrates a smart label according to the present invention. An RFID transponder 1 is positioned between a liner layer 2 on one side of the RFID transponder 1 an adhesive layer 3 and face sheet 9 on the opposite side of the RFID transponder 1, and from the liner layer 2. The adhesive layer 3 may in one embodiment be thicker in dimension from the prior art adhesive layers. In particular, the first face sheet 9 has a significantly increased thickness and/or rigidity as compared to prior art face sheets. The present invention may also utilize a bending beam construction in one embodiment which results in decreased pressure differences across the surface of the printable face sheet. The RFID transponder may therefore be placed virtually anywhere on the label without effecting the ability to print an image at any point along the surface of the label. A more rigid face sheet results in a more consistent and uniform distribution of head pressure from the printer. This minimizes pressure differences and vastly improves the print quality. The first face sheet 9 of the present invention may be made of a higher density and/or higher stiffness material as compared to prior art polypropylene or other materials. This eliminates the excessive flexibility and lack of stiffness which would otherwise undermine the ability to present a uniform profile for printing. The thicker and/or less flexible first face sheet 9 does not conform readily to the shape of the RFID transponder in the label, and therefore presents a more uniform surface for printing.

Figure 3:
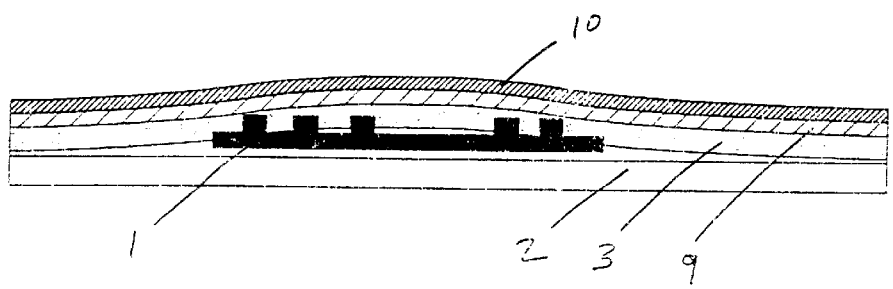
FIG. 3 is a sectioned side view of a further embodiment of the present invention utilizing a liner.

FIG. 3 illustrates a smart label according to the present invention having an RFID transponder positioned between a liner 2 and an adhesive layer 3. A first face sheet 9 may be disposed generally over the adhesive layer 3. A second face sheet 10 may be positioned over the first face sheet 9. In this embodiment, the second face sheet 10 may be of a standard flexible thermal paper stock, but the first face sheet layer 9 may be made from a relatively rigid material such as a rigid paper or a rigid film, so that the combination of the second face sheet 10 together with the first face sheet 9 results in a relatively rigid layered construction which presents a printable second face sheet 10 to the printing device. This construction presents a uniform printable surface to the printer as a result essentially of the underlying first face sheet which resists conforming to the shape of the transponder profile. Other embodiments may include a plurality of layers similar to the first face sheet 9.

Figure 4:
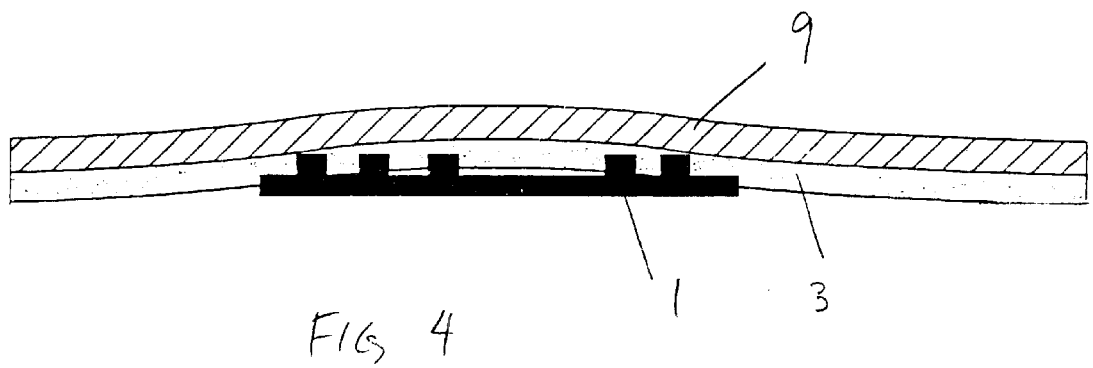
FIG. 4 is a sectioned side view of a further embodiment of a linerless version of the present invention.

FIG. 4 presents an RFID transponder 1 having an adhesive layer 3 disposed on one side thereof. Face sheet 9 is positioned over the adhesive layer 3. It will be noted that this is a linerless application, wherein liner 2 is deleted from the structure. Face sheet 9 may be coated or otherwise constructed to release from the adhesive layer 3.

Figure 5:
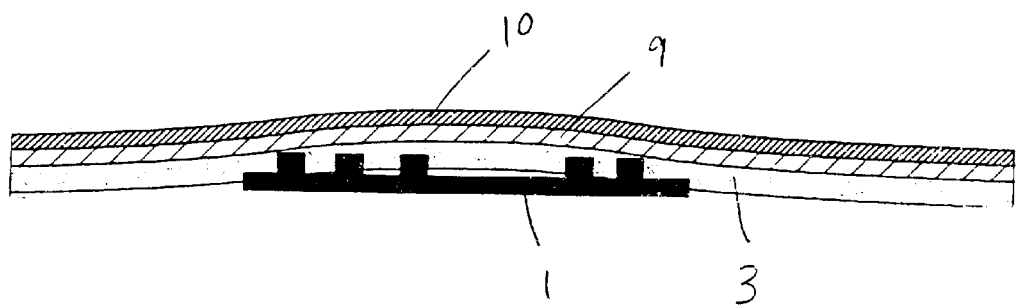
FIG. 5 is a sectioned side view of a further embodiment of a linerless version of the present invention.

FIG. 5 illustrates an RFID transponder 10 having an adhesive layer 3 disposed on one side of it. A first face sheet 9 made of a relatively rigid material covers the adhesive layer 3. A printable second face sheet 10 covers the first face sheet 9. It will be noted that this is another linerless application, and that sheet layer 2 is not present in this structure. Again, face sheet 9 may be coated or otherwise constructed to release from the adhesive layer 3.

In all of FIGS. 2–5, at least one sheet layer having an increased stiffness and/or thickness is disposed along at least one side of the RFID transponder in order to present a relatively smooth printable surface to the printer device. The first face sheet 9 may be of a thickness on the order of 0.004 inches or greater, or may comprise a material having improved rigidity such as a polyester film. The structure having the increased rigidity face sheet 9 exhibits a reduced bending and/or conformance of the printable first face sheet 9 and second face sheet 10 to the shape of the RFID transponder disposed beneath it, such as when the device passes under a thermal print head for printing. This improved label surface profile greatly reduces pressure gradients along the printable surface which would otherwise be caused by the print head, and ultimately improves the print quality.

Additionally, the thicker and/or less flexible face sheet reduces the risk of transponder detection through visual and/or tactile examination. The thicker face sheet 9 and/or 10 provides a decrease in the transmission of light, which further reduces the risk of detection through visual inspection.

The present invention is entitled to a range of equivalents, and is to be limited only by the foregoing claims.

What is claimed is:

1. A smart label, comprising: a liner layer having a top surface and a bottom surface,
    an RFID transponder disposed on the top surface of the liner layer, the RFID transponder having a top side and a bottom side, and presenting at least one peak region and one valley region with respect to the top surface of the liner layer, at least one of the peak regions reaching a point in space further from the top surface of the liner than a point in space reached by at least one of the valley regions,
    an adhesive layer disposed over the liner layer top surface and over the RFID transponder top surface,
    a first printable face sheet disposed over the adhesive layer and over the RFID transponder, the first printable face sheet having a top surface and a bottom surface, the top surface of the first printable face sheet being substantially undeformed by the RFID transponder located beneath it,
    wherein the top surface of the first printable face sheet presents a substantially smooth surface for printing images upon it.

2. A smart label according to claim 1, wherein the first printable face sheet has an average thickness greater than 0.004 inches.

3. A smart label according to claim 1, wherein the first printable face sheet is a polyester film.

4. A smart label according to claim 1, further comprising a second face sheet disposed between the first printable face sheet and the RFID transponder, the second face sheet arranged and constructed to physically reduce the communication of the peak regions and valley regions to the first printable face sheet.

5. A smart linerless label, comprising an RFID transponder having a top surface and a bottom surface, the top surface having at least one peak region and one valley region with respect to the bottom surface,
    an adhesive layer disposed over the top surface of the RFID transponder, and
    a first printable face sheet disposed over the adhesive layer and over the RFID transponder,
    the first printable face sheet having a top surface and a bottom surface, the top surface of the first printable face sheet being substantially undeformed by the RFID transponder located beneath it, wherein the top surface of the first printable face sheet presents a substantially smooth surface for printing images upon it.

6. A smart linerless label according to claim 5, wherein the first printable face sheet has an average thickness greater than 0.004 inches.

7. A smart linerless label according to claim 5, wherein the first printable face sheet is a polyester film.

8. A smart linerless label according to claim 5, further comprising a second face sheet disposed between the first printable face sheet and the RFID transponder, the second face sheet arranged and constructed to physically reduce the communication of the peak regions and the valley regions to the first printable face sheet.

* * * * *